US012710149B2

(12) United States Patent
Zhang et al.

(10) Patent No.: US 12,710,149 B2
(45) Date of Patent: Aug. 18, 2026

(54) LIGHTING LAMP

(71) Applicant: LME (NAN HAI) ELECTRIC CO., LTD., Foshan City (CN)

(72) Inventors: Yuxin Zhang, Foshan City (CN); Hongyan Zhou, Foshan City (CN)

(73) Assignee: LME (NAN HAI) ELECTRIC CO., LTD., Foshan City (CN)

( * ) Notice: Subject to any disclaimer, the term of this patent is extended or adjusted under 35 U.S.C. 154(b) by 0 days.

(21) Appl. No.: 18/783,417

(22) Filed: Jul. 25, 2024

(65) Prior Publication Data

US 2025/0129906 A1 Apr. 24, 2025

(51) Int. Cl.

| | |
|---|---|
| ***F21S 9/00*** | (2006.01) |
| ***F21S 8/00*** | (2006.01) |
| ***F21S 9/03*** | (2006.01) |
| ***F21V 1/04*** | (2006.01) |
| ***F21V 17/06*** | (2006.01) |
| ***F21V 23/00*** | (2015.01) |
| ***F21V 23/04*** | (2006.01) |
| ***F21V 23/06*** | (2006.01) |
| *F21Y 107/50* | (2016.01) |
| *F21Y 115/10* | (2016.01) |

(52) U.S. Cl.
CPC ............... *F21S 9/035* (2013.01); *F21S 8/036* (2013.01); *F21V 1/04* (2013.01); *F21V 17/06* (2013.01); *F21V 23/009* (2013.01); *F21V 23/0464* (2013.01); *F21V 23/0471* (2013.01); *F21V 23/06* (2013.01); *F21Y 2107/50* (2016.08); *F21Y 2115/10* (2016.08)

(58) Field of Classification Search
CPC .. F21S 9/035; F21S 8/036; F21V 1/04; F21V 17/06; F21V 23/009; F21V 23/0464; F21V 23/0471
See application file for complete search history.

(56) References Cited

U.S. PATENT DOCUMENTS 10,264,654 B2 * 4/2019 Chen ........................ F21S 8/036
10,514,140 B2 * 12/2019 Sreshta ................. F21V 31/005
(Continued)

FOREIGN PATENT DOCUMENTS

WO 0146616 A1 6/2001

*Primary Examiner* — Gerald J Sufleta, II
(74) *Attorney, Agent, or Firm* — Rondaus PLLC; George Liu

(57) ABSTRACT

The present disclosure relates to a lighting lamp and belongs to the field of lighting. The lighting lamp includes: a lamp housing, wherein the lamp housing is provided with a lamp body accommodating cavity; a first light source component, wherein the first light source component is provided on the lamp housing, and a luminous surface of the first light source component is located in the lamp body accommodating cavity; a second light source component, wherein the second light source component is provided on the first light source component or the lamp housing; and an electrical connecting component, wherein the electrical connecting component is provided on the lamp housing, the electrical connecting component is electrically connected to the first light source component and the second light source component, and the electrical connecting component is used to electrically connect to an external power source.

20 Claims, 13 Drawing Sheets

(56) References Cited

U.S. PATENT DOCUMENTS

| | | | | |
|---|---|---|---|---|
| 2014/0035483 A1* | 2/2014 | Becker | F21S 9/02 | |
| | | | 362/184 | |
| 2016/0057829 A1* | 2/2016 | Li | F21K 9/232 | |
| | | | 315/313 | |
| 2023/0059676 A1* | 2/2023 | Peng | F21S 9/037 | |
| 2024/0023218 A1* | 1/2024 | Lin | H05B 45/382 | |

* cited by examiner

LIGHTING LAMP

TECHNICAL FIELD

The present disclosure herein relates to the field of lighting, and in particular to a lighting lamp.

BACKGROUND

As the energy crisis intensifies, the price of oil and electricity increases. At the same time, due to the decrease in the price per watt of solar panels and the price of energy storage batteries, solar energy applications have become more common in households. However, the energy reserve of solar lights varies with weather conditions, and users utilize the lights for varying lengths of time, which can easily result in a waste of electrical energy. Furthermore, the lighting control method of the lamps is limited, and the intelligence level of the lighting control is low, leading to a poor user experience.

SUMMARY

Based on this, it is necessary to provide a lighting lamp to address the problem of a single lighting control method and low level of intelligence in control.

A lighting lamp, including: a lamp housing, wherein the lamp housing is provided with a lamp body accommodating cavity; a first light source component, wherein the first light source component is provided on the lamp housing, and a luminous surface of the first light source component is located in the lamp body accommodating cavity; a second light source component, wherein the second light source component is provided on the first light source component or the lamp housing, and a luminous surface of the second light source component is located in the lamp body accommodating cavity; and an electrical connecting component, wherein the electrical connecting component is provided on the lamp housing, the electrical connecting component is electrically connected to the first light source component and the second light source component, and the electrical connecting component is used to electrically connect to an external power source.

The lighting lamp disclosed in the present disclosure can choose to turn on different lamps in different situations by arranging a first light source component and a second light source component in the lamp housing. For example, when you need to save power or when no one is around, you can choose to turn on either the first light source component or the second light source component. And when there are people present or you need a brighter environment, you can turn on both the first light source component and second light source component simultaneously. At the same time, the configuration of the electrical connecting component facilitates the simultaneous electrical connection of both the first light source component and second light source component to the outside, thereby making it more convenient to control, and ensuring a high level of control intelligence.

In one of the embodiments, the first light source component includes a first mounting plate, a first lamp bead and a supporting plate; the supporting plate is provided on the lamp housing, the mounting plate is provided on the supporting plate, and the first lamp bead is provided on the first mounting plate.

In one of the embodiments, the second light source component includes a second mounting plate and a second lamp bead; and the second mounting plate is provided on the first mounting plate, a horizontal direction of the second mounting plate intersects with a length direction of the lamp housing, the second mounting plate extends along the length direction of the lamp housing, a plurality of second lamp beads are arranged, and the plurality of second lamp beads are sequentially arranged along an extension direction of the second mounting plate. By arranging the second mounting plate on the first mounting plate and extending along the length direction of the lamp housing, a plurality of second lamp beads can be used to form different lighting effects. For example, the shape of the lamp housing can be configured to be used with a plurality of second lamp beads to form a flame effect in the vertical direction.

In one of the embodiments, a plurality of first lamp beads are arranged, and the plurality of first lamp beads are distributed on the first mounting plate.

In one of the embodiments, the electrical connecting component includes a Universal Serial Bus (USB) plug and a socket component; the USB plug is provided on the lamp housing, the USB plug is electrically connected to the first light source component and the second light source component, the socket component is provided on the lamp housing, and the socket component is adapted to the USB plug.

In one of the embodiments, the socket component includes a USB socket, a positioning member, a positioning base and a wiring tube; a portion of the positioning member passes through the USB socket and then is connected to the lamp housing, the positioning base is located between the USB socket and the lamp housing, the wiring tube is connected to the positioning base, and the USB socket is adapted to the USB plug.

In one of the embodiments, the lamp housing is provided with a mounting cavity, the USB plug is located at a top of a cavity wall of the mounting cavity, and the socket component is located at a bottom of the cavity wall of the mounting cavity.

In one of the embodiments, the lamp housing includes a lampshade housing and a base housing; the lampshade housing is provided on the base housing, the lampshade housing is provided with the lamp body accommodating cavity, the lampshade housing and the base housing are enclosed to form a mounting cavity, and a portion of the electrical connecting component is located in the mounting cavity.

In one of the embodiments, the lampshade housing includes a supporting housing and a lampshade; the supporting housing is provided on the base housing, and the supporting housing and the base housing are enclosed to form the mounting cavity; the lampshade is provided on the supporting housing, and the lampshade and the supporting housing are enclosed to form the lamp body accommodating cavity; the first light source component is provided on the supporting housing; and the portion of the electrical connecting component is provided on the supporting housing, and another portion of the electrical connecting component is provided on the base housing.

In one of the embodiments, the second light source component includes a second mounting plate and a second lamp bead; the second mounting plate is arranged on the first light source component or the lamp housing, and the second mounting plate extends along the length direction of the lamp housing; a plurality of second lamp beads are arranged, the plurality of second lamp beads are sequentially arranged on the second mounting plate along the length direction of the second mounting plate, and the plurality of second lamp beads form a first luminous surface and a second luminous surface on both sides of the second mounting plate, respectively; and the lampshade forms a first supporting section and a first arc-shaped section that are sequentially connected to one side opposite to the first luminous surface, the lampshade forms a second supporting section, a second arc-shaped section and a third arc-shaped section that are sequentially connected to one side opposite to the second luminous surface, and the third arc-shaped section is connected to the first arc-shaped section.

In one of the embodiments, the base housing includes a base body and a buckle plate; and a buckle groove is provided on the lampshade housing, the buckle plate is provided on the base body, and the buckle plate is adapted to the buckle groove.

In one of the embodiments, it further comprises a power module, a switch module and a motion sensing module; the power module is configured to supply power to the first light source component and the second light source component; the switch module includes a first switch module and a second switch module; the first switch module is connected between the power module and the first light source component, and the second switch module is connected between the power module and the second light source component; and the motion sensing module is connected to the power module, the first switch module and the second switch module respectively, and the motion sensing module is used to control an on/off of the first switch module and the second switch module.

In one of the embodiments, the power module includes a solar panel component, an energy storage battery and a power processing module; the solar panel component is connected to the energy storage battery, the energy storage battery is connected to the motion sensing module, the first switch module and the second switch module respectively, and the power processing module is connected to the solar panel component and the energy storage battery respectively.

In one of the embodiments, the motion sensing module includes a motion sensor, and the motion sensor is connected to the power module, the first switch module and the second switch module respectively. Based on the motion sensor being connected to the power module, when the system is powered on, the power module can supply power to the motion sensor, so that the motion sensor can detect whether someone is approaching.

In one of the embodiments, the first switch module includes a first switch tube, and the second switch module includes a second switch tube; and gate electrodes of the first switch tube and the second switch tube are connected to the motion sensor, source electrodes of the first switch tube and the second switch tube are connected to the power module, and drain electrodes of the first switch tube and the second switch tube are connected to the first light source component. When no one is approaching, the first switch tube is turned off, and the second switch tube is either turned off or turned on, thereby reducing power consumption and conserving energy. When someone approaches, the second switch tube is turned off, while the first switch tube is turned on, or both the first switch tube and the second switch tube are turned on simultaneously, providing users with effective and sufficient lighting, and enhancing the level of intelligence in lighting control for the lamp.

In one of the embodiments, it further comprises a power adjustment module, and the power adjustment module is connected to the motion sensing module and the first light source component respectively; and the power adjustment module is configured to adjust a luminous power of the first light source component according to the distance information detected by the motion sensing module. Based on its connections to both the motion sensing module and the first light source component, the power adjustment module controls the first light source component to provide different lighting brightness according to the user's approaching distance.

In one of the embodiments, it further comprises a brightness sensing module, the brightness sensing module is connected to the power module and the second switch module respectively, and the brightness sensing module is configured to control the on/off of the second switch module according to the detected brightness information. Based on the brightness sensing module connected to the power module, the brightness sensing module can be used to detect the light intensity of the external environment and control the on/off of the second switch module, further improving the intelligence of lighting control of the lamp.

In one of the embodiments, it further comprises a lampshade body component; the lampshade body component is provided with an accommodating cavity, and the lamp housing and the electrical connecting component are provided on the lampshade body component and are located in the accommodating cavity; and the solar panel component is provided on the lampshade body component, the solar panel component can be unfolded or stored relative to the lampshade body component, and the solar panel component is electrically connected to the first light source component and the second light source component.

In one of the embodiments, the solar panel component is rotatably connected to the lampshade body component, and the solar panel component can be unfolded or stored relative to the lampshade body component when rotating relative to the lampshade body component.

In one of the embodiments, the solar panel component and the lampshade body component are detachable; when the solar panel component is provided on the lampshade body component, the solar panel component is unfolded relative to the lampshade body component, and the solar panel component can be stored in the lampshade body component when disassembled from the lampshade body component.

In one of the embodiments, the solar panel component includes a supporting plate and a solar panel; the supporting plate is rotatably connected to the lampshade body component, and a mounting groove is provided on the supporting plate; and the solar panel is provided on the supporting plate and is clamped at the mounting groove.

In one of the embodiments, the supporting plate includes a supporting plate body and a hinge rod, and the mounting groove is provided on the supporting plate body, the solar panel is provided on the supporting plate body, the hinge rod is provided on the supporting plate body, and the hinge rod is rotatably provided on the lampshade body component.

In one of the embodiments, it further includes a locking member, wherein the locking member is provided on the supporting plate and is located at a connection between the supporting plate and the lampshade body component.

In one of the embodiments, the lampshade body component includes a supporting component, a cover body component and an outer lampshade, the cover body component is provided on the supporting component, the outer lampshade is provided on the cover body component, the outer lampshade is provided with the accommodating cavity, the lamp housing is provided on the cover body component or the outer lampshade, and the solar panel component is provided on the cover body component or the outer lampshade.

In one of the embodiments, the cover body component includes an upper cover, a control box and a hanging hook, the control box is provided on the upper cover, the outer lampshade is provided on the control box, and the hanging hook is provided on the upper cover and is connected to the supporting component, the outer lampshade is provided on the control box, and the solar panel component is rotatably provided on the upper cover.

In one of the embodiments, the supporting component includes a back plate, a supporting rod and a connecting tube, and the supporting rod is provided on the back plate, the supporting rod is adapted to the hanging hook, one end of the connecting tube is connected to the control box, and another end of the connecting tube is connected to the back plate.

In one of the embodiments, the outer lampshade includes an outer lampshade bracket and a panel, the outer lampshade bracket is provided on the control box, the outer lampshade bracket is provided with a plurality of light transmitting openings, a plurality of panels are arranged, and the plurality of panels are provided on the outer lampshade bracket and are respectively covered at the plurality of light transmitting openings.

In one of the embodiments, a limiting groove is provided on the upper cover, opposite sides of a groove wall of the limiting groove are provided with limiting holes, the limiting holes are adapted to the solar panel component, and the solar panel component is rotatably connected to the upper cover at the limiting hole.

DETAILED DESCRIPTION OF THE EMBODIMENTS

Figure 1:
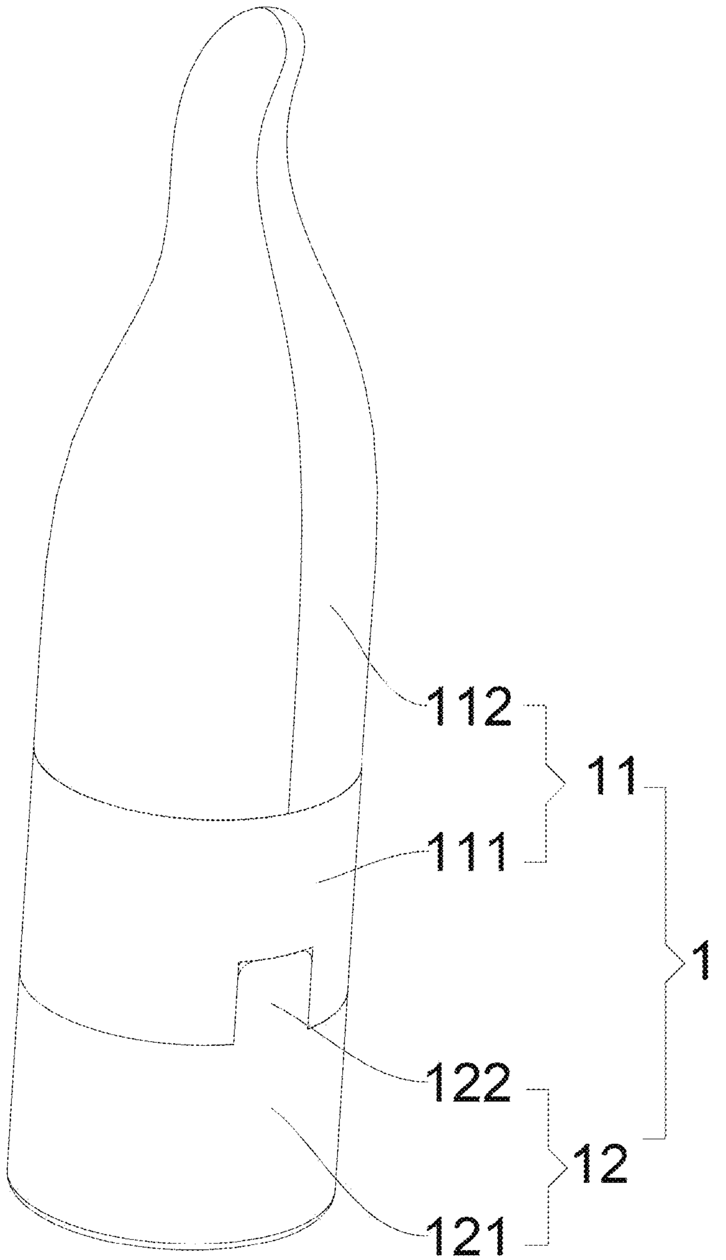
FIG. 1 is a stereograph of a lamp housing, a first light source component, a second light source component and an electrical connecting component.

Although many specific details are described below to facilitate a full understanding of the present disclosure, the present disclosure can also be implemented in other ways different from those described herein. Therefore, the scope of protection of the present disclosure is not limited by the specific embodiments disclosed below.

Embodiment 1

As shown in FIGS. 1 to 4, this embodiment discloses a lighting lamp, including: a lamp housing 1, wherein the lamp housing 1 is provided with a lamp body accommodating cavity 101; a first light source component 2, wherein the first light source component 2 is provided on the lamp housing 1, and a luminous surface of the first light source component 2 is located in the lamp body accommodating cavity 101; a second light source component 3, wherein the second light source component 3 is provided on the first light source component 2 or the lamp housing 1, and a luminous surface of the second light source component 3 is located in the lamp body accommodating cavity 101; and an electrical connecting component 4, wherein the electrical connecting component 4 is provided on the lamp housing 1, the electrical connecting component 4 is electrically connected to the first light source component 2 and the second light source component 3, and the electrical connecting component 4 is used to electrically connect to an external power source.

The lighting lamp disclosed in the present disclosure can choose to turn on different lamps in different situations by arranging a first light source component 2 and a second light source component 3 in the lamp housing 1. For example, when you need to save power or when no one is around, you can choose to turn on either the first light source component 2 or the second light source component 3. And when there are people present or you need a brighter environment, you can turn on both the first light source component 2 and second light source component 3 simultaneously. At the same time, the configuration of the electrical connecting component 4 facilitates the simultaneous electrical connection of both the first light source component 2 and second light source component 3 to the outside, thereby making it more convenient to control. For example, the electrical connecting component 4 can be set as a type A or type C interface to realize separate electrical connections of multiple different light sources. Multiple different light sources can be controlled separately through external control devices. Different types of light sources can be used through the type A interface. The lights achieve different effects and cost less.

Figure 2:
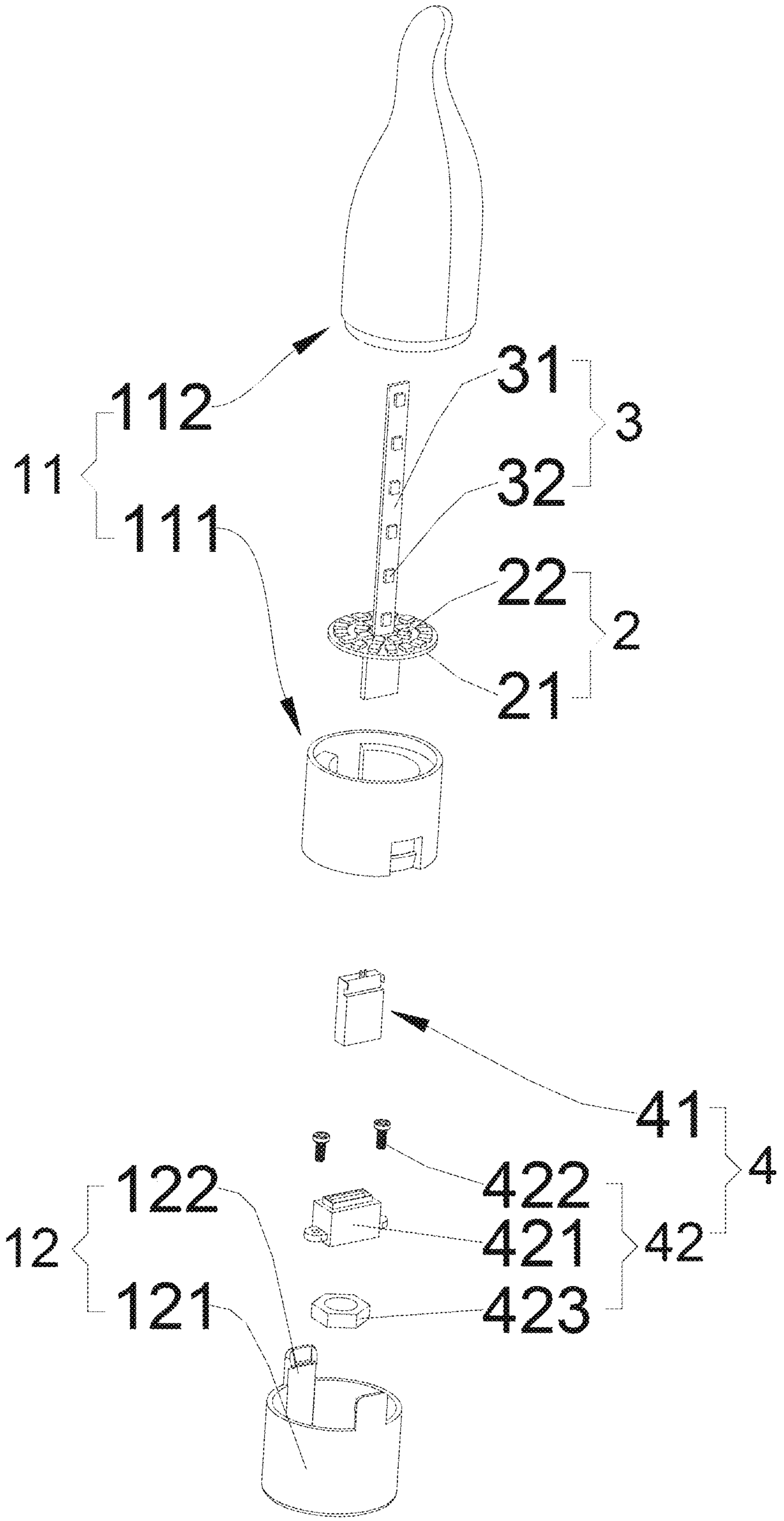
FIG. 2 is an exploded view of a lamp housing, a first light source component, a second light source component and an electrical connecting component.
Figure 3:
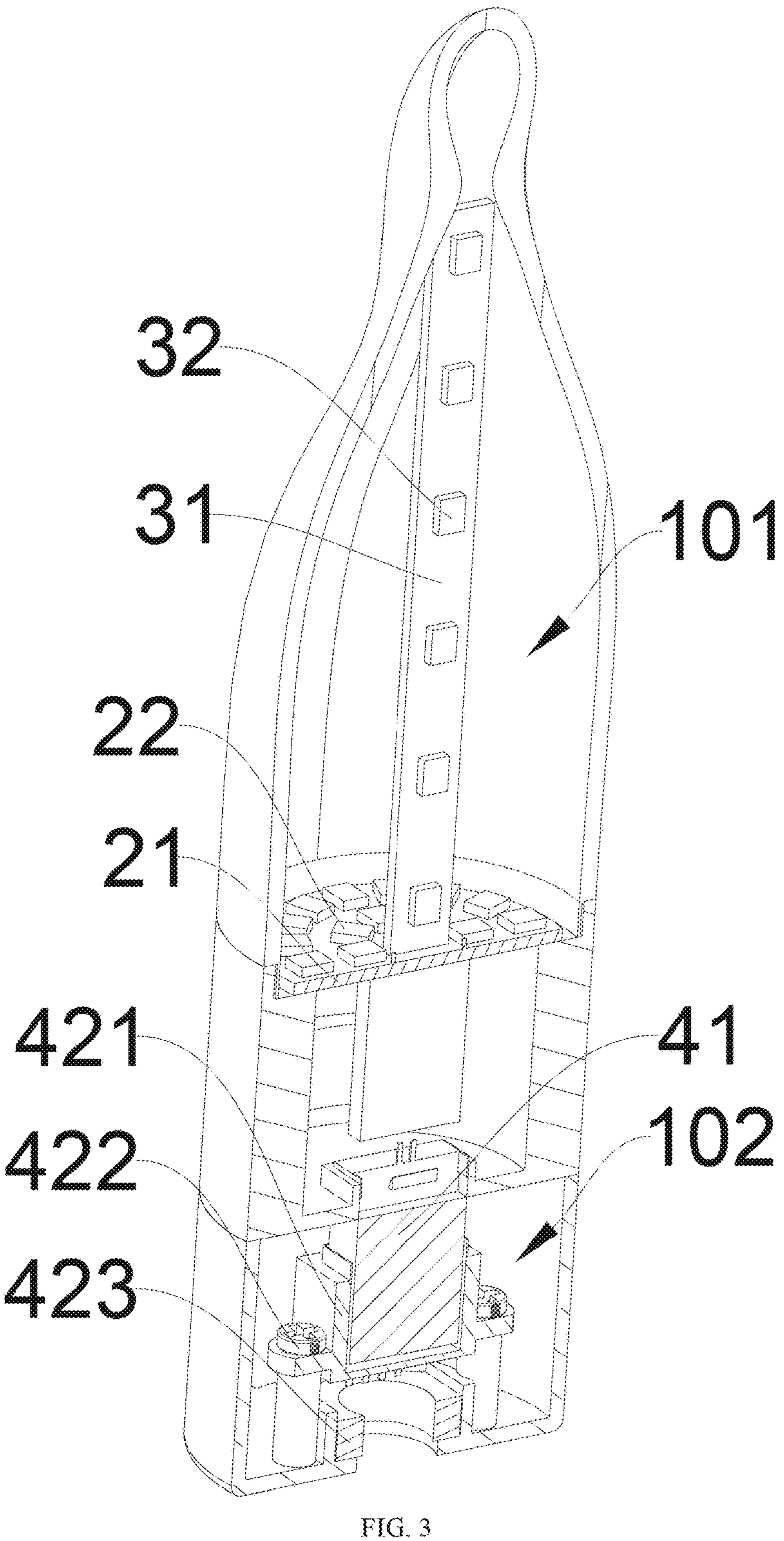
FIG. 3 is a first cross-sectional view of a lamp housing, a first light source component, a second light source component and an electrical connecting component.

As shown in FIGS. 2 and 3, in addition to the features of the above embodiment, this embodiment is further limited: the first light source component 2 includes a first mounting plate 21, a first lamp bead 22 and a supporting plate 23; the supporting plate 23 is provided on the lamp housing 1, the mounting plate 21 is provided on the supporting plate 23, and the first lamp bead 22 is provided on the first mounting plate 21. The first mounting plate 21 can be positioned and installed within the lamp body accommodating cavity 101 of the lamp housing 1 by means of the limiting plate 23, and illumination is provided by the light emitted from the first lamp bead 22, which is mounted on the first mounting plate 21.

As shown in FIGS. 2 and 3, in addition to the features of the above embodiment, this embodiment is further limited: the second light source component 3 includes a second mounting plate 31 and a second lamp bead 32; and the second mounting plate 31 is provided on the first mounting plate 21, a horizontal direction of the second mounting plate 31 intersects with a length direction of the lamp housing 1, the second mounting plate 31 extends along the length direction of the lamp housing 1, a plurality of second lamp beads 32 are arranged, and the plurality of second lamp beads 32 are sequentially arranged along an extension direction of the second mounting plate 31. By arranging the second mounting plate 31 on the first mounting plate 21 and extending along the length direction of the lamp housing 1, a plurality of second lamp beads 32 can be used to form different lighting effects. For example, the shape of the lamp housing 1 can be configured to be used with a plurality of second lamp beads 32 to form a flame effect in the vertical direction.

As shown in FIGS. 2 and 3, in addition to the features of the above embodiment, this embodiment is further limited: a plurality of first lamp beads 22 are arranged, and the plurality of first lamp beads 22 are distributed on the first mounting plate 21. The arrangement of plurality of first lamp beads 22 can make the light stronger and more uniform, ensuring the final lighting effect and improving the brightness of the lighting.

As shown in FIGS. 2 and 3, in addition to the features of the above embodiment, this embodiment is further limited: the electrical connecting component 4 includes a USB plug 41 and a socket component 42; the USB plug 41 is provided on the lamp housing 1, the USB plug 41 is electrically connected to the first light source component 2 and the second light source component 3, the socket component 42 is provided on the lamp housing 1, and the socket component 42 is adapted to the USB plug 41. The cooperative arrangement of the USB plug 41 and the socket component 42 simplifies the electrical connection method. During use, the USB plug 41 can be electrically connected to the first light source component 2 and the second light source component 3. Additionally, multiple light sources can be connected via the USB plug 41, and the cooperation of the USB plug 41 with the socket component 42 can facilitate quick electrical connection. The socket component 42 can realize more convenient electrical connection with the outside and has a simpler and more compact structure. By utilizing a standardized interface (taking Type A as an example here), the same light source is equipped with two input power interfaces simultaneously. In contrast, products commonly available on the market, such as E26 lamp holders, only have one L (Live) and N (Neutral) pole, enabling only a single set of electrical input. When there are demands for light bulbs with different color temperatures or lighting requirements for different functions (such as the flame lamp circuit involved in this patent), the control circuitry can only be placed inside the bulb. However, due to limited space, this can affect light emission effects, as well as lead to poor heat dissipation in the enclosed space, ultimately impacting the bulb's lifespan. The present disclosure leverages existing standardized interfaces to create a standardized light source product with multiple input interfaces, facilitating the control and use of intelligent products while also simplifying user replacement.

As shown in FIGS. 2 and 3, in addition to the features of the above embodiment, this embodiment is further limited: the socket component 42 includes a USB socket 421, a positioning member 422, a positioning base 423 and a wiring tube; a portion of the positioning member 422 passes through the USB socket 421 and then is connected to the lamp housing 1, the positioning base 423 is located between the USB socket 421 and the lamp housing 1, the wiring tube is connected to the positioning base 423, and the USB socket 421 is adapted to the USB plug 41. The setting of the USB socket 421 makes it convenient to quickly cooperate with the USB plug 41, and the setting of positioning member 422 can stably assemble the USB socket 421 on the lamp housing 1. By clamping the positioning base 423 by means of the cooperating of the USB socket 421 and the lamp housing 1, the positioning base 423 can be stably positioned. The setting of the wiring tube can facilitate wiring and protect the wires.

In addition to the features of the above embodiment, this embodiment is further limited: the interface of the USB plug is a Type A interface, and it further includes at least one light source component, and at least one of the light source component is connected to the USB plug. The combination of light sources can be made more diverse by means of adding at least one additional light source component to the first light source component 2 and the second light source component 3.

In addition to the features of the above embodiment, this embodiment further limits: the interface of the USB plug is a Type C interface. Due to the rise of intelligent lights, a light bulb now incorporates two color temperatures, the RGB (Red, Green, Blue) three primary colors, and a total of five light sources. Furthermore, Type C's multi-interface can be utilized to create a light bulb, where the control circuit is placed externally, thus facilitating the reduction of costs in intelligent light.

As shown in FIGS. 2 and 3, in addition to the features of the above embodiment, this embodiment is further limited: the lamp housing 1 is provided with a mounting cavity 102, the USB plug 41 is located at a top of a cavity wall of the mounting cavity 102, and the socket component 42 is located at a bottom of the cavity wall of the mounting cavity 102. By providing the mounting cavity 102 on the lamp housing 1, the USB plug 41 and the socket component 42 can be hidden, and the electrical connection area can be separated from the outside world to ensure that no leakage of the electrical connection area will cause safety accidents during use. Moreover, the structure can be assembled more compactly through the arrangement of the mounting cavity 102.

As shown in FIGS. 2 and 3, in addition to the features of the above embodiment, this embodiment is further limited: the lamp housing 1 includes a lampshade housing 11 and a base housing 12; the lampshade housing 11 is provided on the base housing 12, the lampshade housing 11 is provided with the lamp body accommodating cavity 101, the lampshade housing 11 and the base housing 12 are enclosed to form a mounting cavity 102, and a portion of the electrical connecting component 4 is located in the mounting cavity 102. Through the cooperation between the base housing 12 and the lampshade housing 11, the lampshade housing 11 and the base housing 12 can be disassembled during installation. After disassembly, the first light source component 2, the second light source component 3 and the electrical connection component 4 can be more conveniently assembled, and the overall structure is more convenient for production and maintenance.

As shown in FIGS. 2 and 3, in addition to the features of the above embodiment, this embodiment is further limited: the lampshade housing 11 includes a supporting housing 111 and a lampshade 112; the supporting housing 111 is provided on the base housing 12, and the supporting housing 111 and the base housing 12 are enclosed to form the mounting cavity 102; the lampshade 112 is provided on the supporting housing 111, and the lampshade 112 and the supporting housing 111 are enclosed to form the lamp body accommodating cavity 101; the first light source component 2 is provided on the supporting housing 111; and the portion of the electrical connecting component 4 is provided on the supporting housing 111, and another portion of the electrical connecting component 4 is provided on the base housing 12. The first light source component 2 and the second light source component 3 can be protected by means of the cooperation of the lampshade 112 and the supporting housing 111, the lampshade 112 can achieve light transmission, and the lampshade 112 can be designed according to needs to achieve different effects.

Figure 4:
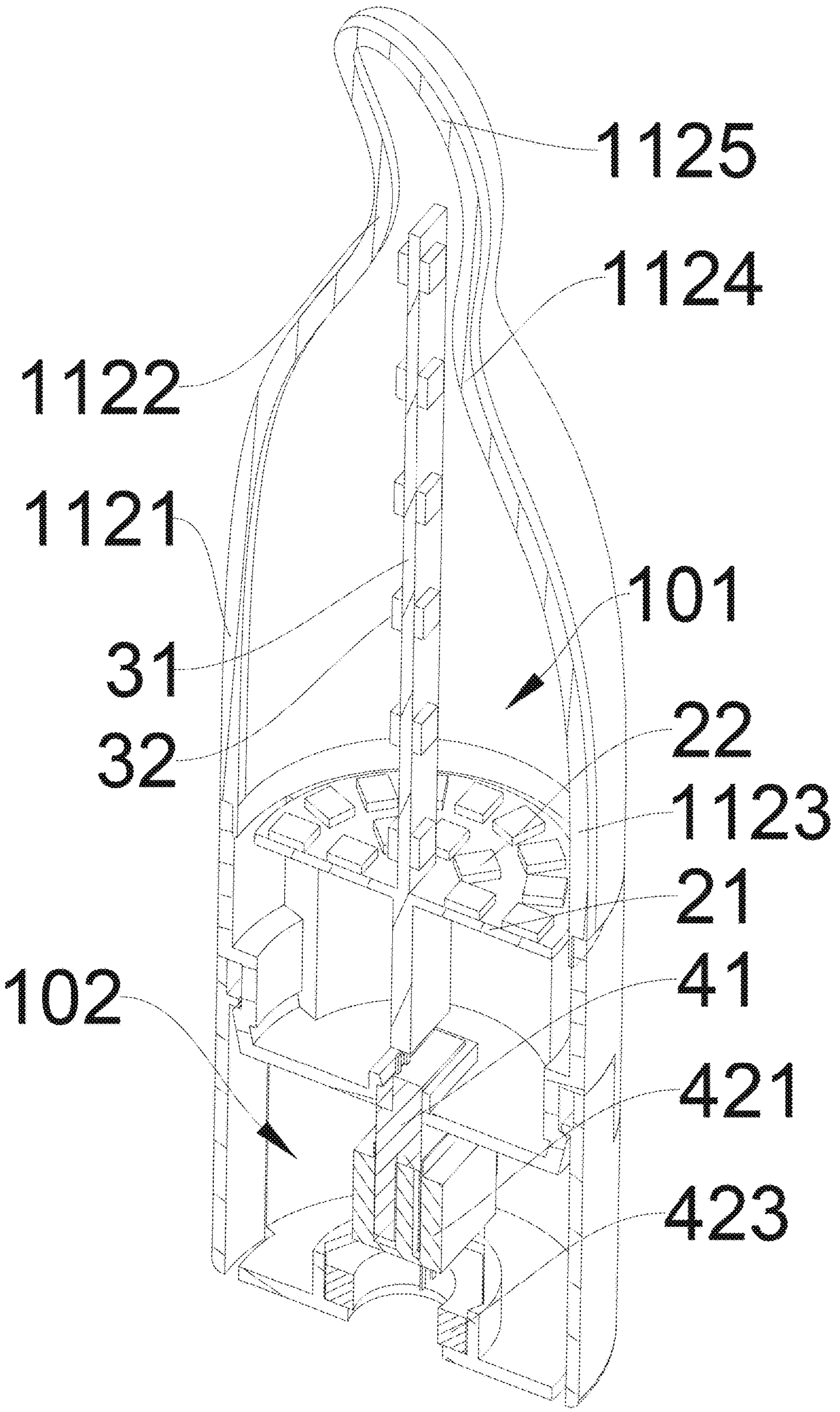
FIG. 4 is a second cross-sectional view of a lamp housing, a first light source component, a second light source component and an electrical connecting component.

As shown in FIGS. 2 and 4, in addition to the features of the above embodiment, this embodiment is further limited: the second light source component 3 includes a second mounting plate 31 and a second lamp bead 32; the second mounting plate 31 is arranged on the first light source component 2 or the lamp housing 1, and the second mounting plate 31 extends along the length direction of the lamp housing 1; a plurality of second lamp beads 32 are arranged, the plurality of second lamp beads 32 are sequentially arranged on the second mounting plate 31 along the length direction of the second mounting plate 31, and the plurality of second lamp beads 32 form a first luminous surface and a second luminous surface on both sides of the second mounting plate 31, respectively; and the lampshade 112 forms a first supporting section 1121 and a first arc-shaped section 1122 that are sequentially connected to one side opposite to the first luminous surface, the lampshade 112 forms a second supporting section 1123, a second arc-shaped section 1124 and a third arc-shaped section 1125 that are sequentially connected to one side opposite to the second luminous surface, and the third arc-shaped section 1125 is connected to the first arc-shaped section 1122. Different lighting effects can be achieved by designing the shape of the lampshade 112. A first supporting section 1121, a first arc-shaped section 1122, a second supporting section 1123, a second arc-shaped section 1124 and a third arc-shaped section 1125 are formed on both sides of the lampshade 112, respectively. Through the different arc-shaped forms on both sides, it can cooperate with a plurality of second lamp beads 32 on the second mounting plate 31 to achieve the desired lighting effect, such as the flame effect. Moreover, the second mounting plate 31 has a lower cost, which can reduce the cost of achieving the flame effect, and the lampshade 112 is easier to process. By designing the shape of the lampshade 112, it can better cooperate with the second light source component 3.

As shown in FIGS. 2 and 3, in addition to the features of the above embodiment, this embodiment is further limited: the base housing 12 includes a base body 121 and a buckle plate 122; and a buckle groove 103 is provided on the lampshade housing 11, the buckle plate 122 is provided on the base body 121, and the buckle plate 122 is adapted to the buckle groove 103. By arranging the buckle plate 122 on the base body 121, the component can be made more convenient. When the base housing 12 and the lampshade housing 11 need to be assembled, the buckle plate 122 only needs to be clicked into the buckle groove 103 for positioning and component, making the component process more simple and reliable.

Figure 5:
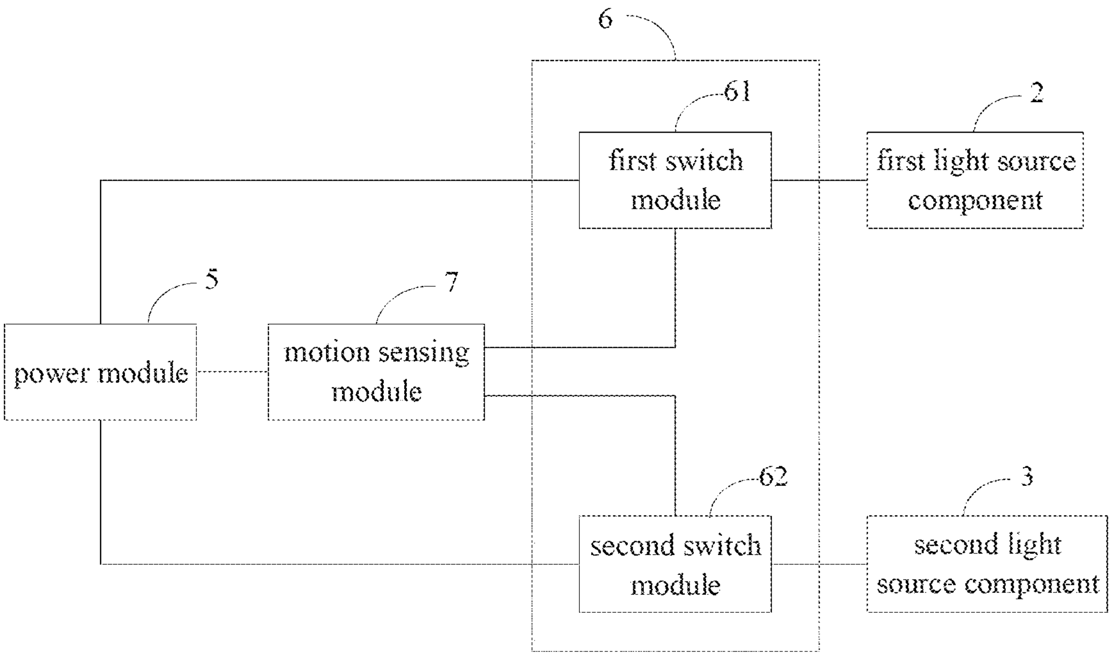
FIG. 5 is a first circuit diagram of a lighting lamp.

As shown in FIG. 5, in addition to the features of the above-mentioned embodiment, this embodiment is further limited to include: it further comprises a power module 5, a switch module 6 and a motion sensing module 7; the power module 5 is configured to supply power to the first light source component 2 and the second light source component 3; the switch module 6 includes a first switch module 61 and a second switch module 62; the first switch module 61 is connected between the power module 5 and the first light source component 2, and the second switch module 62 is connected between the power module 5 and the second light source component 3; and the motion sensing module 7 is connected to the power module 5, the first switch module 61 and the second switch module 62 respectively, and the motion sensing module 7 is used to control an on/off of the first switch module 61 and the second switch module 62. Because the luminous power of the second light source component 3 is less than the luminous power of the first light source component 2, when the distance information detected by the motion sensing module 7 is less than the preset value, the first switch module 61 is turned on and the second switch module 62 is turned off, or the first switch module 61 and the second switch module 62 are turned on at the same time, so that the first light source component 2 illuminates alone, or the first light source component 2 and the second light source component 3 illuminate at the same time, thereby enhancing the lighting brightness. When no one is approaching, the first switch module 61 is turned off, and the second switch module 62 is turned on or off, so that the second light source component 3 illuminates alone, or the first light source component 2 and the second light source component 3 are turned off at the same time, and the lamp working in low-power mode reduces power consumption, saves energy, improves the intelligence of lighting control, and enhances user experience.

Figure 6:
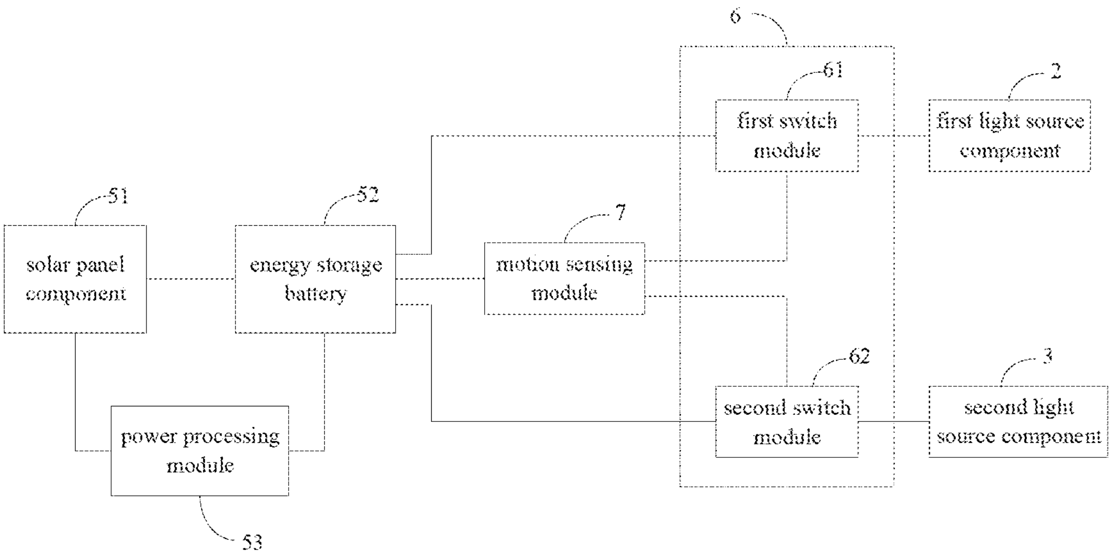
FIG. 6 is a second circuit diagram of a lighting lamp.

As shown in FIG. 6, in addition to the features of the above embodiment, this embodiment is further limited: the power module 5 includes a solar panel component 51, an energy storage battery 52 and a power processing module 53; the solar panel component 51 is connected to the energy storage battery 52, the energy storage battery 52 is connected to the motion sensing module 7, the first switch module 61 and the second switch module 62 respectively, and the power processing module 53 is connected to the solar panel component 51 and the energy storage battery 52 respectively. The solar panel component 51 converts solar energy into electrical energy and transmits the electrical energy to the energy storage battery 52 to charge the energy storage battery 52.

Figure 7:
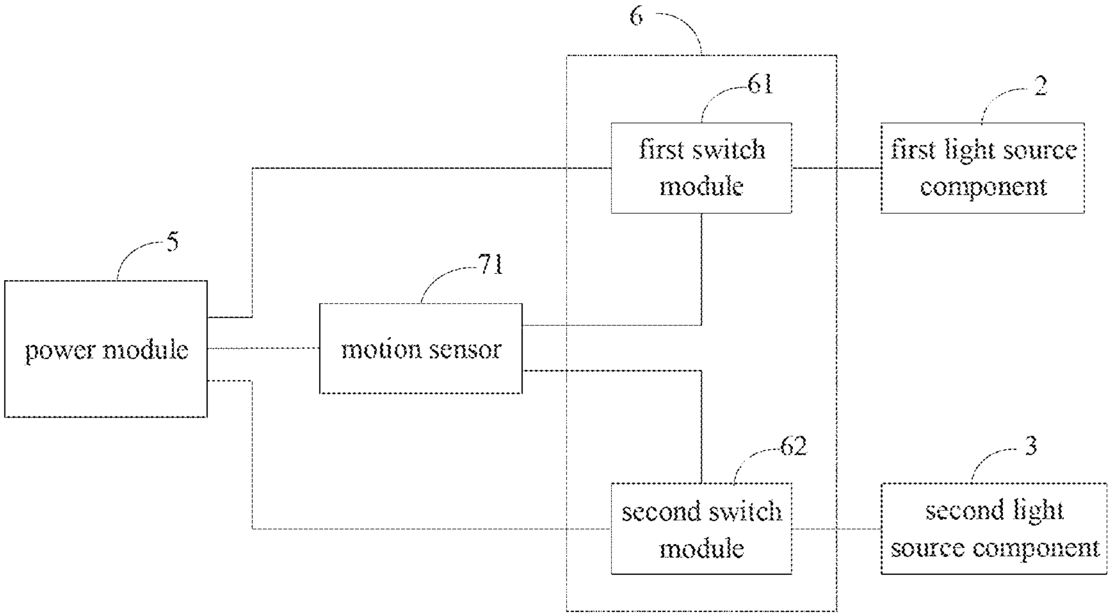
FIG. 7 is a third circuit diagram of a lighting lamp.

As shown in FIG. 7, in addition to the features of the above embodiment, this embodiment is further limited: the motion sensing module 7 includes a motion sensor 71, and the motion sensor 71 is connected to the power module 5, the first switch module 61 and the second switch module 62 respectively. Based on the motion sensor 71 being connected to the power module 5, when the system is powered on, the power module 5 can supply power to the motion sensor 71, so that the motion sensor 71 can detect whether someone is approaching.

As shown in FIG. 7, in addition to the features of the above embodiment, this embodiment is further limited: the first switch module 61 includes a first switch tube 611, and the second switch module 62 includes a second switch tube 621; and gate electrodes of the first switch tube 611 and the second switch tube 621 are connected to the motion sensor 71, source electrodes of the first switch tube 611 and the second switch tube 621 are connected to the power module 5, and drain electrodes of the first switch tube 611 and the second switch tube 621 are connected to the first light source component 2. When no one is approaching, the first switch tube 312 is turned off, and the second switch tube 322 is either turned off or turned on, thereby reducing power consumption and conserving energy. When someone approaches, the second switch tube 322 is turned off, while the first switch tube 312 is turned on, or both the first switch tube and the second switch tube are turned on simultaneously, providing users with effective and sufficient lighting, and enhancing the level of intelligence in lighting control for the lamp.

Figure 8:
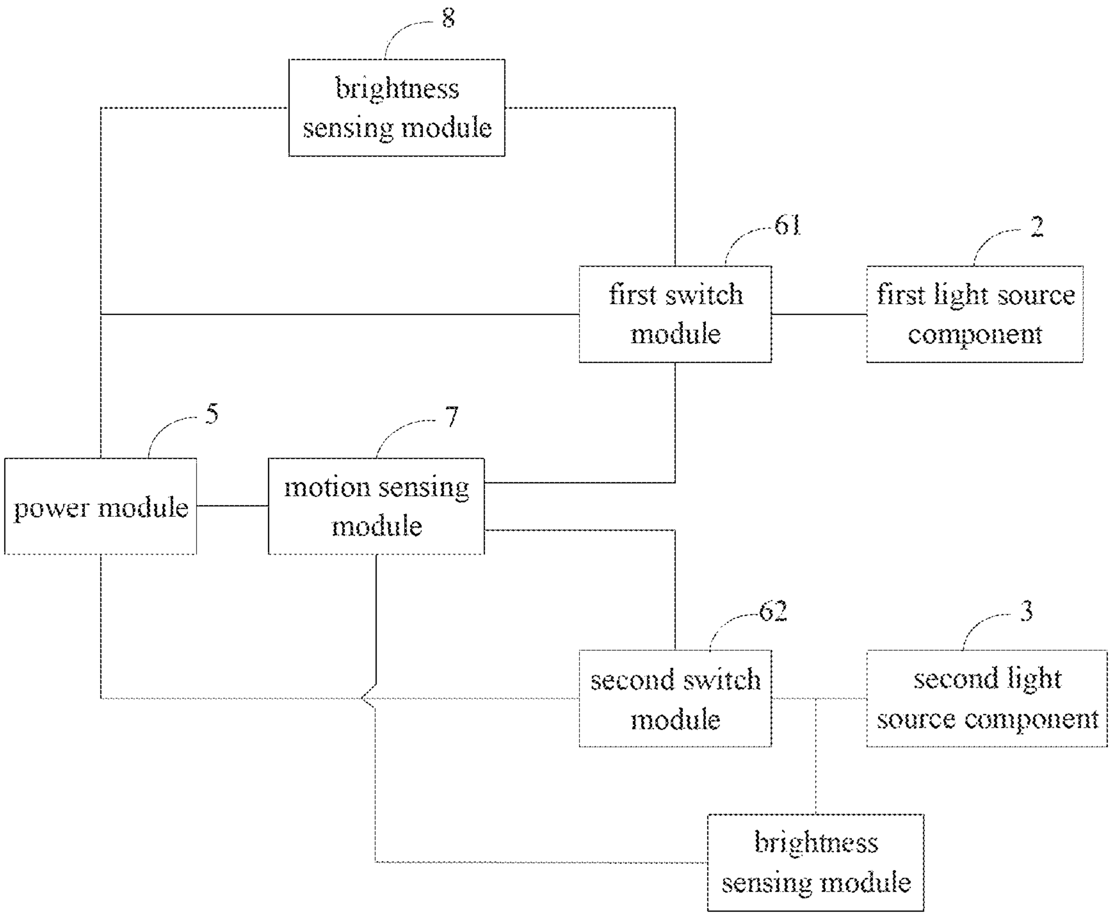
FIG. 8 is a fourth circuit diagram of a lighting lamp.

As shown in FIG. 8, in addition to the features of the above embodiment, this embodiment is further limited: it further comprises a power adjustment module, and the power adjustment module is connected to the motion sensing module 7 and the first light source component 2 respectively; and the power adjustment module is configured to adjust a luminous power of the first light source component 2 according to the information detected by the motion sensing module 7. Based on its connections to both the motion sensing module 7 and the first light source component 2, the power adjustment module controls the first light source component 2 to provide different lighting brightness according to the user's approaching distance.

As shown in FIG. 8, in addition to the features of the above embodiment, this embodiment is further limited: it further comprises a brightness sensing module 8, the brightness sensing module 8 is connected to the power module 5 and the second switch module 62 respectively, and the brightness sensing module 8 is configured to control the on/off of the second switch module 62 according to the detected brightness information. Based on the brightness sensing module 8 connected to the power module 5, the brightness sensing module 8 can be used to detect the light intensity of the external environment and control the on/off of the second switch module 62, further improving the intelligence of lighting control of the lamp.

Figure 9:
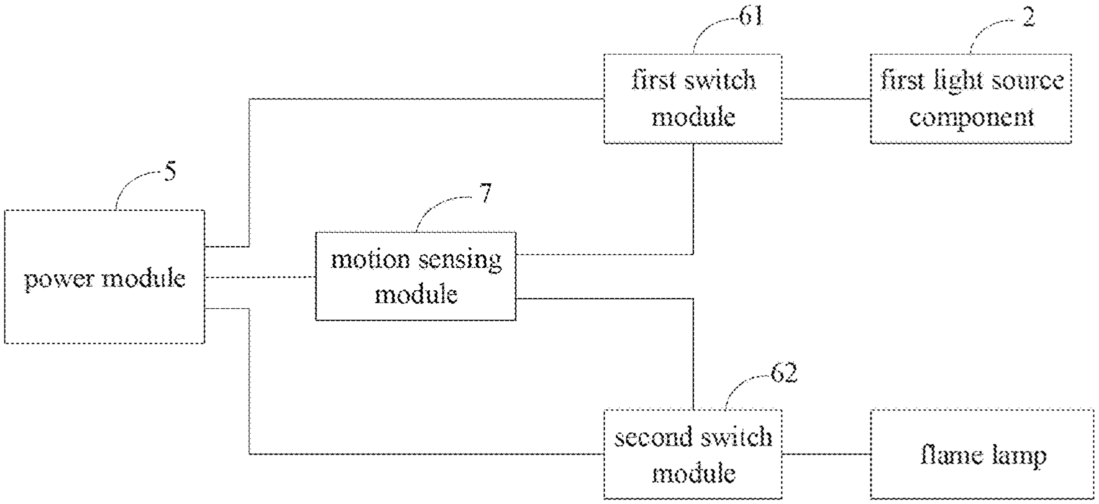
FIG. 9 is a fourth circuit diagram of a lighting lamp.

As shown in FIG. 9, in addition to the features of the above embodiment, this embodiment is further limited: the second light source component 3 is a flame lamp. By using the second light source component 3 as a flame lamp, the decorative effect is improved and the user experience is enhanced.

Figure 10:
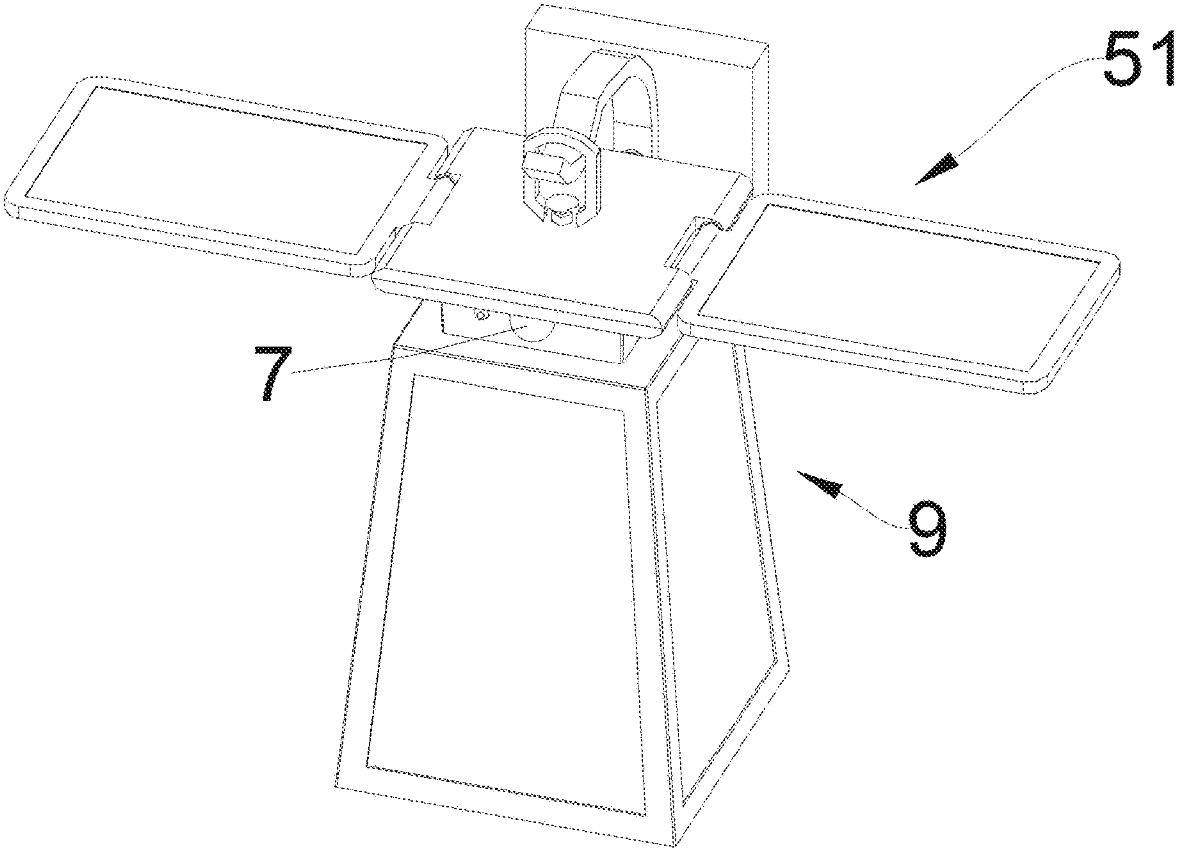
FIG. 10 is a first stereograph of a lighting lamp.
Figure 11:
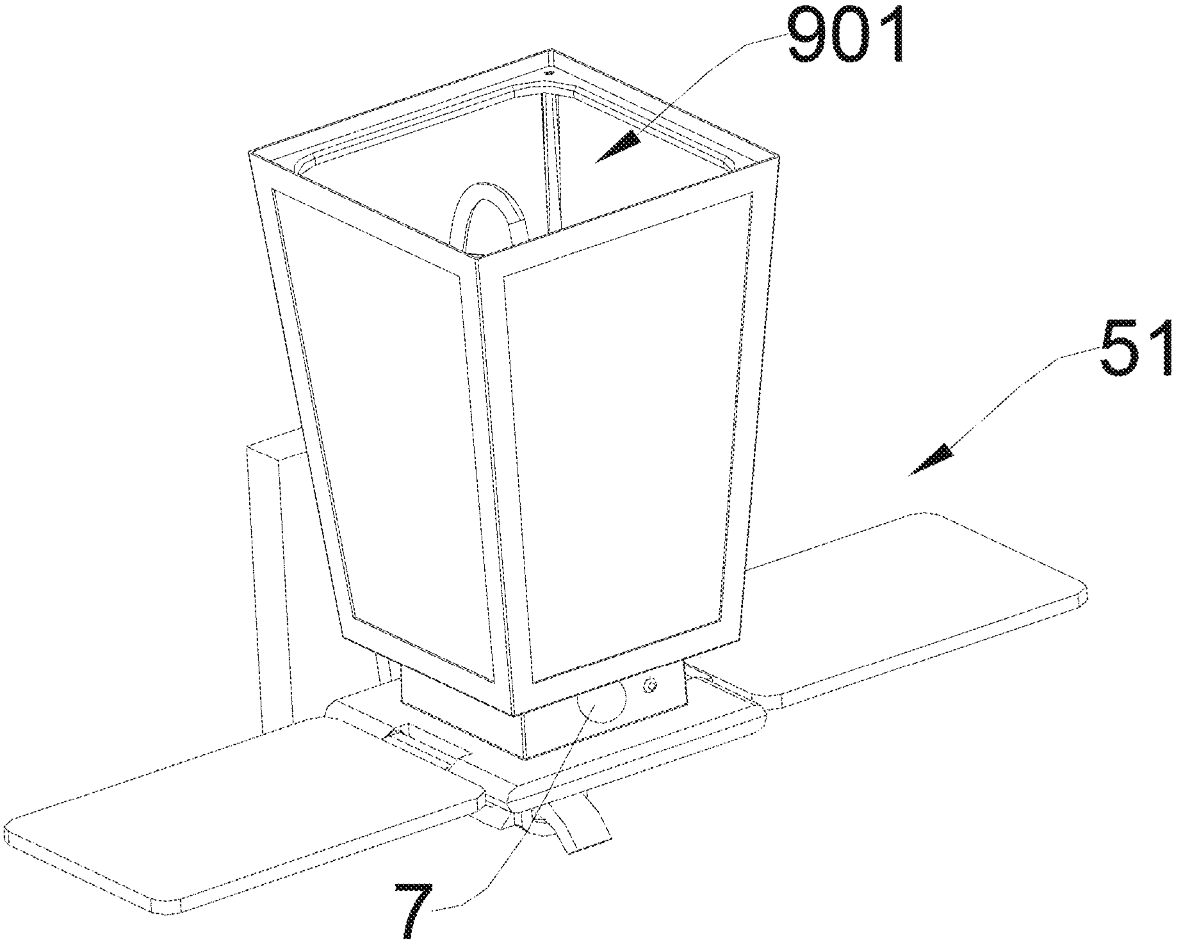
FIG. 11 is a second stereograph of a lighting lamp.
Figure 12:
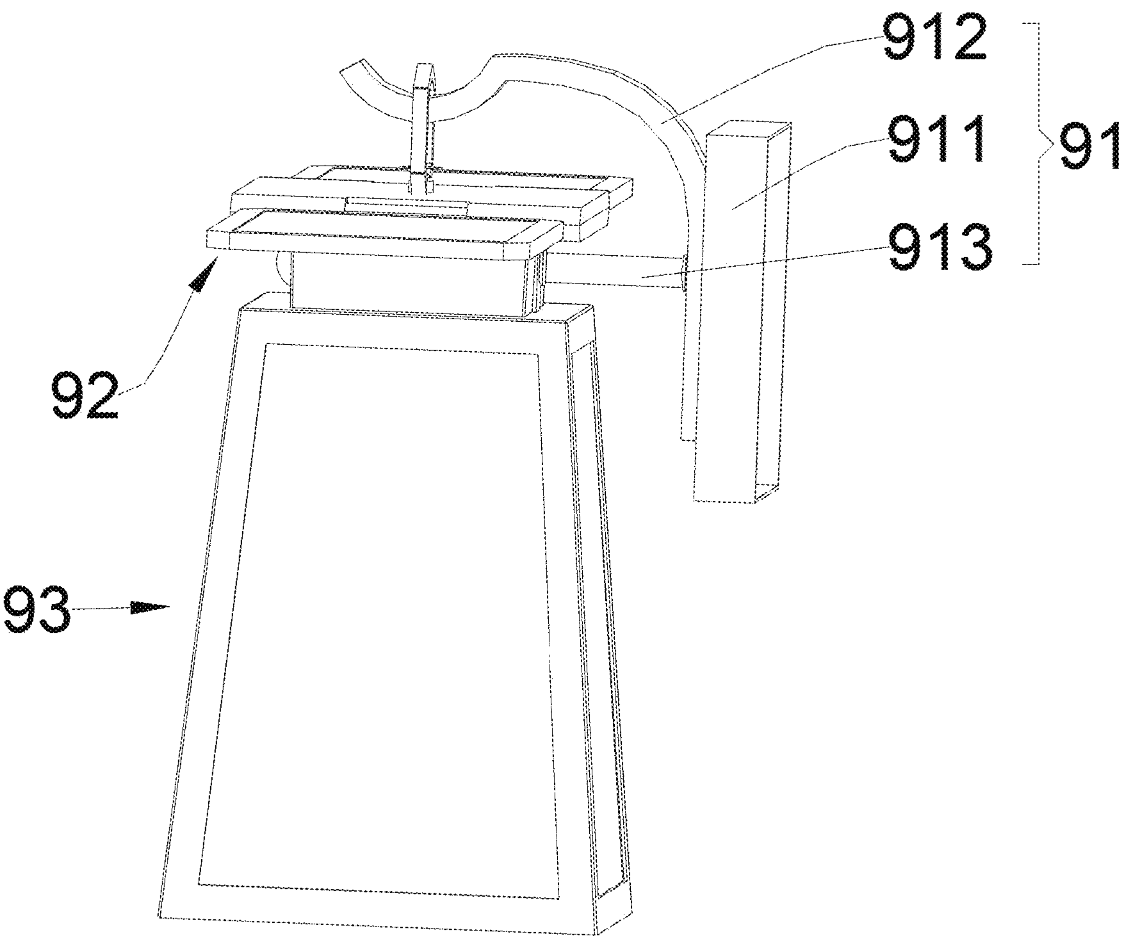
FIG. 12 is a third stereograph of a lighting lamp.

As shown in FIGS. 10 to 12, in addition to the features of the above embodiment, this embodiment is further limited: it further comprises a lampshade body component 9; the lampshade body component 9 is provided with an accommodating cavity 901, and the lamp housing 1 and the electrical connecting component 4 are provided on the lampshade body component 9 and are located in the accommodating cavity 901; and the solar panel component 51 is provided on the lampshade body component 9, the solar panel component 51 can be unfolded or stored relative to the lampshade body component 9, and the solar panel component 51 is electrically connected to the first light source component 2 and the second light source component 3. By providing the solar panel component 51 on the lampshade body component 9 and allowing it to be unfolded or stored relative to the lampshade body component 9, the solar panel component 51 can absorb solar energy and convert it into electricity to supply power to the first light source component 2 and the second light source component 3 when the solar panel component 51 is unfolded and provided on the lampshade body component 9. When power supply is not needed on cloudy days or at night, it can be stored by rotating or disassembling. The cooperation between the solar panel component 51 and the lampshade body component 9 makes it more convenient to use.

As shown in FIGS. 11 and 12, in addition to the features of the above embodiment, this embodiment is further limited: the solar panel component 51 is rotatably connected to the lampshade body component 9, and the solar panel component 51 can be unfolded or stored relative to the lampshade body component 9 when rotating relative to the lampshade body component 9. Through the rotational connection between the solar panel component 51 and the lampshade body component 9, when solar power supply is needed, the solar panel component 51 can be rotated relative to the lampshade body component 9 in order to align it better with the sun's position and, in its unfolded state, increase the surface area exposed to sunlight. When there is no need to use the first light source component 2 and the second light source component 3 for lighting, the solar panel component 51 can be stored in a folded state, thereby extending the service life of the solar panel component 51.

As shown in FIGS. 10 and 11, in addition to the features of the above embodiment, this embodiment is further limited: the solar panel component 51 and the lampshade body component 9 are detachable; when the solar panel component 51 is provided on the lampshade body component 9, the solar panel component 51 is unfolded relative to the lampshade body component 9, and the solar panel component 51 can be stored in the lampshade body component 9 when disassembled from the lampshade body component 9. Through the detachable arrangement between the solar panel component 51 and the lampshade body component 9, the solar panel component 51 can be assembled onto the lampshade body component 9 when solar power supply is needed. Once assembled, the solar panel component 51 can be unfolded or expanded, allowing for solar power supply to be achieved. When solar power is not needed, the solar panel component 51 can be detached from the lampshade body component 9 for storage.

Figure 14:
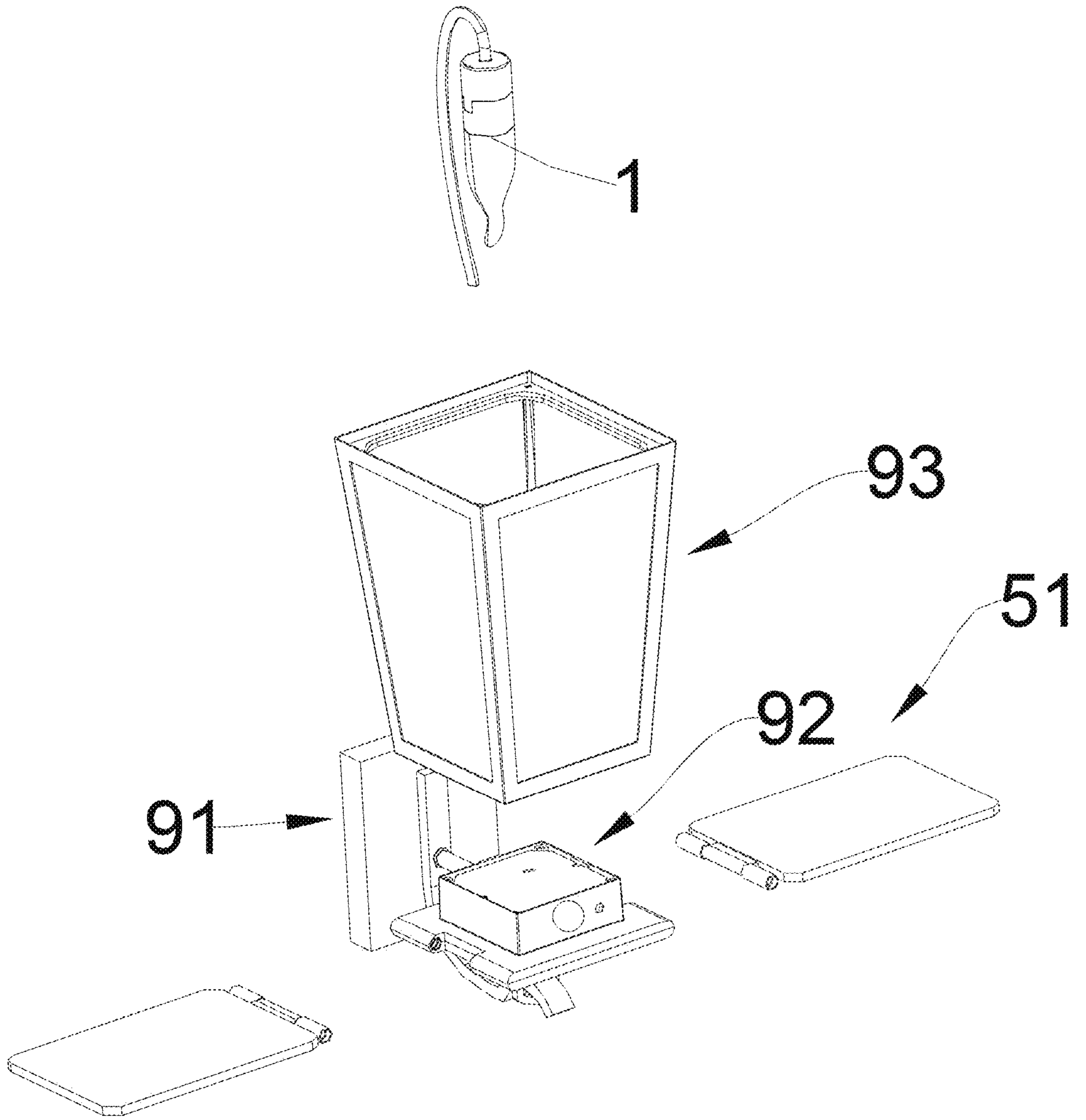
FIG. 14 is a second exploded view of a lighting lamp.
Figure 16:
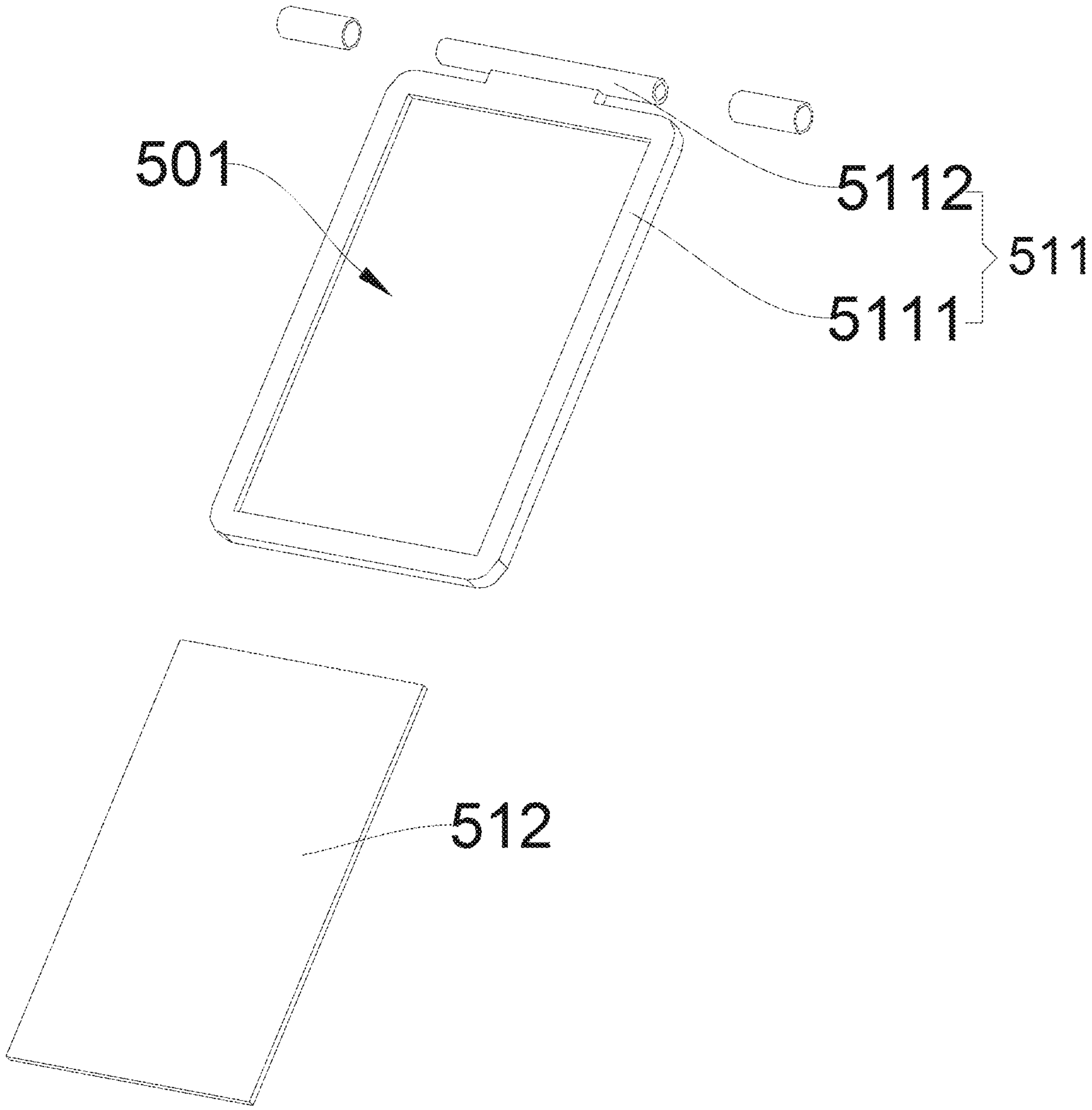
FIG. 16 is an exploded view of a solar panel component.

As shown in FIGS. 14 and 16, in addition to the features of the above embodiment, this embodiment is further limited: the solar panel component 51 includes a supporting plate 511 and a solar panel 512; the supporting plate 511 is rotatably connected to the lampshade body component 9, and a mounting groove 501 is provided on the supporting plate 511; and the solar panel 512 is provided on the supporting plate 511 and is clamped at the mounting groove 501. By providing the supporting plate 511 on the lampshade body component 9 in a rotatable manner, a simpler position adjustment can be achieved. By providing the mounting groove 501 on the supporting plate 511, it facilitates cooperation with the solar panel 512 for quick component, resulting in a simple and reliable component method that enhances the production efficiency of the solar panel component 51.

Figure 15:
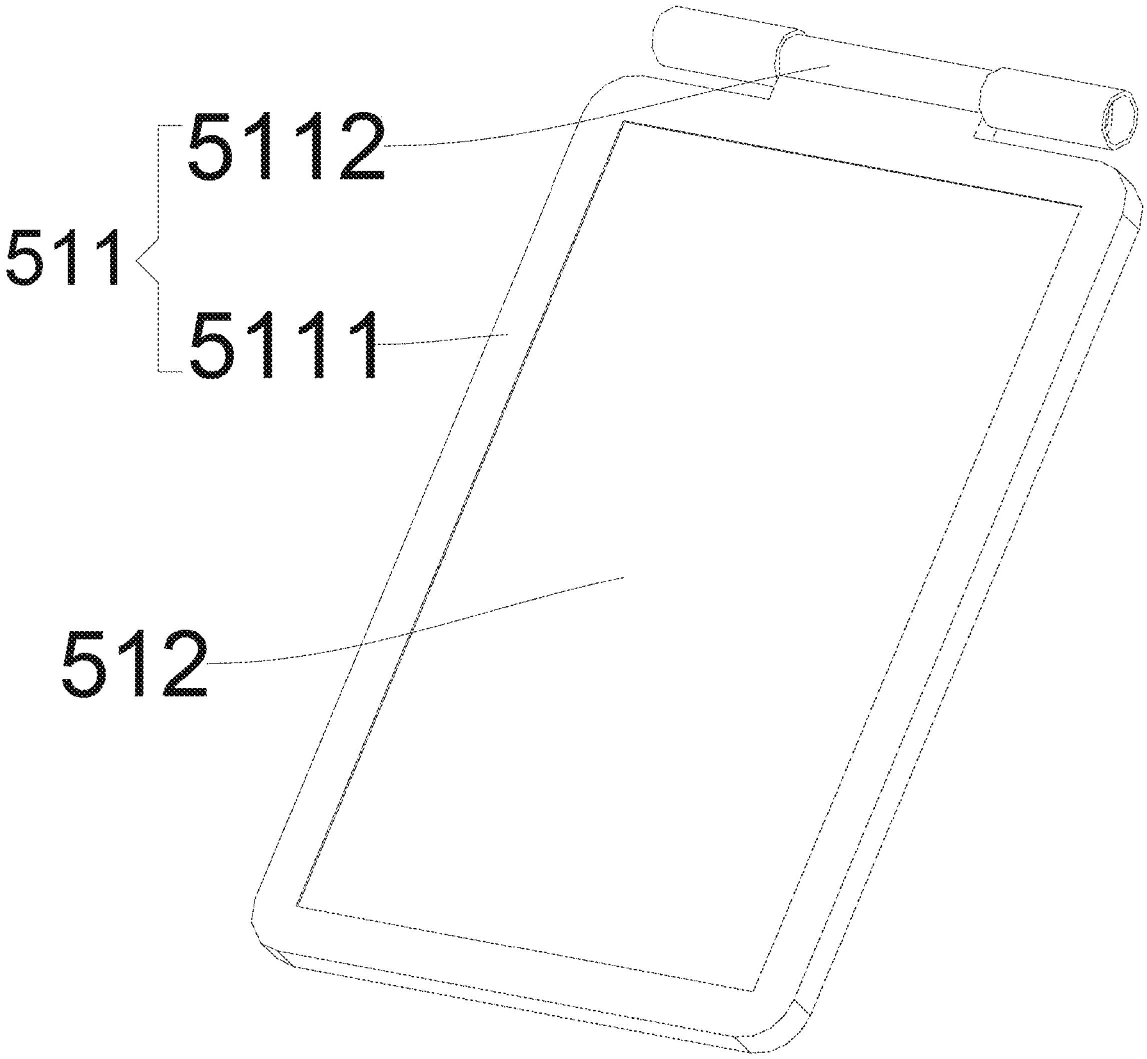
FIG. 15 is a stereograph of a solar panel component.

As shown in FIGS. 15 and 16, in addition to the features of the above embodiment, this embodiment is further limited: the supporting plate 511 includes a supporting plate body 5111 and a hinge rod 5112, and the mounting groove 501 is provided on the supporting plate body 5111, the solar panel 512 is provided on the supporting plate body 5111, the hinge rod 5112 is provided on the supporting plate body 5111, and the hinge rod 5112 is rotatably provided on the lampshade body component 9. By providing the hinge rod 5112 on the supporting plate body 5111, through the rotational connection between the hinge rod 5112 and the lampshade body component 9, when rotation is needed, the supporting plate body 5111 can be moved to cause the hinge rod 5112 to rotate on the lampshade body component 9. The arrangement of the hinge rod 5112 simplifies the connection process.

As shown in FIGS. 15 and 16, in addition to the features of the above embodiment, this embodiment is further limited to: it further includes a locking member, wherein the locking member is provided on the supporting plate 511 and located at a connection between the supporting plate 511 and the lampshade body component 9. Through the arrangement of the locking member, the supporting plate 511 can be positioned after the supporting plate 511 and the lampshade body component 9 are rotated, and the positioning method is simple and reliable. When solar power supply is needed, the supporting plate 511 is rotated and can be quickly positioned be means of the locking member after unfolding.

Figure 13:
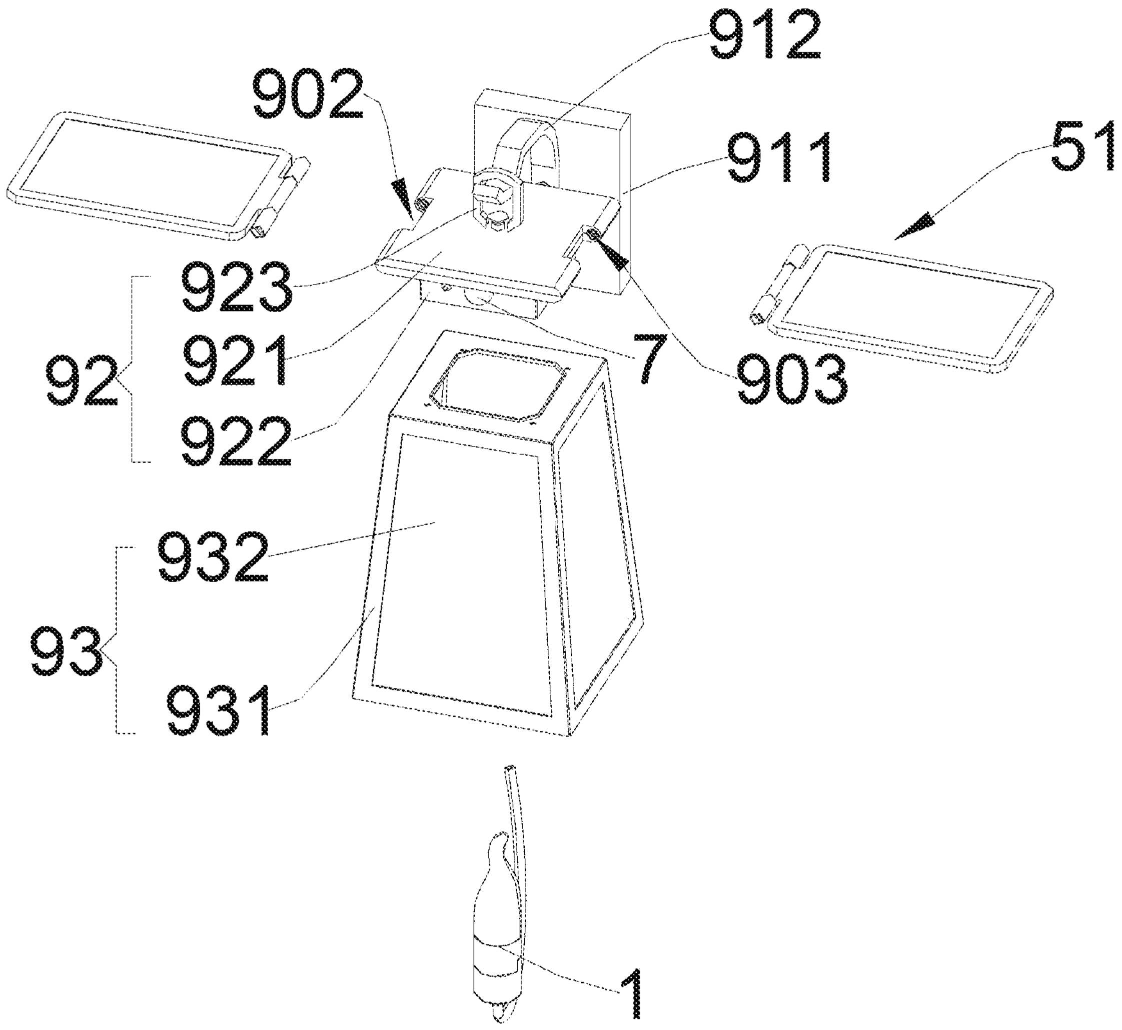
FIG. 13 is a first exploded view of a lighting lamp.

As shown in FIGS. 13 and 14, in addition to the features of the above embodiment, this embodiment is further limited: the lampshade body component 9 includes a supporting component 91, a cover body component 92 and an outer lampshade 93, the cover body component 92 is provided on the supporting component 91, the outer lampshade 93 is provided on the cover body component 92, the outer lampshade 93 is provided with the accommodating cavity 901, the lamp housing 1 is provided on the cover body component 92 or the outer lampshade 93, and the solar panel component 51 is provided on the cover body component 92 or the outer lampshade 93. By assembling the supporting component 91 with the external structure, the outer lampshade 93 can be stably assembled on the cover body component 92 after assembling the cover body component 92 on the supporting component 91, and the stable component can be realized through the cooperation of the supporting component 91, the cover body component 92 and the outer lampshade 93. The solar panel component 51 can also be assembled and supported more efficiently by means of the cover body component 92 or the outer lampshade 93.

As shown in FIGS. 13 and 14, in addition to the features of the above embodiment, this embodiment is further limited: the cover body component 92 includes an upper cover 921, a control box 922 and a hanging hook 923, the control box 922 is provided on the upper cover 921, the outer lampshade 93 is provided on the control box 922, and the hanging hook 923 is provided on the upper cover 921 and is connected to the supporting component 91, the outer lampshade 93 is provided on the control box 922, and the solar panel component 51 is rotatably provided on the upper cover 921. The upper cover 921 can be stably assembled with the solar panel component 51, and the providing of the control box 922 can facilitate the component of required circuit boards or batteries and other structures in the control box 922, making it more convenient to use and protecting the inner portion. The hanging hook 923 can be arranged to cooperate with the supporting component 91. The hanging hook 923 can be positioned and supported via the supporting component 91. The configuration of the hanging hook 923 can cooperate with the supporting component 91 more stably.

As shown in FIGS. 12 and 13, in addition to the features of the above embodiment, this embodiment is further limited: the supporting component 91 includes a back plate 911, a supporting rod 912 and a connecting tube 913, and the supporting rod 912 is provided on the back plate 911, the supporting rod 912 is adapted to the hanging hook 923, one end of the connecting tube 913 is connected to the control box 922, and another end of the connecting tube 913 is connected to the back plate 911. The back plate 911 can be stably connected to the external structure, and the supporting rod 912 can cooperate with the hanging hook 923 to support the hanging hook 923. The cooperation method is simple and reliable. Through the arrangement of the connecting tube 913, it is convenient to connect the electrical structure of the extendable solar lamp with external components, and the implementation method is simple and reliable.

As shown in FIG. 13, in addition to the features of the above embodiment, this embodiment is further limited: the outer lampshade 93 includes an outer lampshade bracket 931 and a panel 932, the outer lampshade bracket 931 is provided on the control box 922, the outer lampshade bracket 931 is provided with a plurality of light transmitting openings, a plurality of panels 932 are arranged, and the plurality of panels 932 are provided on the outer lampshade bracket 931 and are respectively covered at the plurality of light transmitting openings. The outer lampshade bracket 931 can be assembled stably through the cooperation with the control box 922, and through the arrangement of a plurality of light transmission openings, it can cooperate with the panel 932 to achieve omnidirectional light transmission and high light transmission efficiency.

As shown in FIG. 13, in addition to the features of the above embodiment, this embodiment is further limited: a limiting groove 902 is provided on the upper cover 921, opposite sides of a groove wall of the limiting groove 902 are provided with limiting holes 903, the limiting holes 903 are adapted to the solar panel component 51, and the solar panel component 51 is rotatably connected to the upper cover 921 at the limiting hole 903. By providing the limiting groove 902 on the upper cover 921 and the limiting holes 903 on both sides of the limiting groove 902, the solar panel component 51 can be limited through the limiting holes 903 on both sides. This limiting approach is simple, enabling quick component. The component method is simple and reliable.

Embodiment 2

This embodiment discloses a dual light source control system. The dual light source control system comprises a lighting component, a power module 5, a switch module 6 and a motion sensing module 7. The lighting component includes a first light source component 2 and a second light source component 3; the luminous power of the second light source component 3 is smaller than the luminous power of the first light source component 2; the power module 5 is configured to supply power to the lighting component; the switch module 6 includes a first switch module 61 and a second switch module 62; the first switch module 61 is connected between the power module 5 and the second light source component 3, and the second switch module 62 is connected between the power module 5 and the first light source component 2; the motion sensing module 7 is connected to the power module 5, the first switch module 61 and the second switch module 62 respectively; and the motion sensing module 7 is configured to control the on/off of the second switch module 62 according to the detected motion information, and control the on/off of the first switch module 61.

Embodiment 3

This embodiment discloses an extendable solar lamp, comprising: a lampshade body component 9, wherein the lampshade body component 9 is provided with an accommodating cavity 901; a light source component, wherein the light source component is provided on the lampshade body component 9 and is located in the accommodating cavity 901; and a solar panel component 51, wherein the solar panel component 51 is provided on the lampshade body component 9, the solar panel component 51 can be unfolded or stored relative to the lampshade body component 9, and the solar panel component 51 is electrically connected to the light source component.

The light source component is a lighting lamp.

The above embodiments merely represent several embodiments of the present disclosure, and their descriptions are relatively specific and detailed, but they should not be construed as limiting the scope of the present disclosure. It should be noted that, for those of ordinary skill in the art, several modifications and improvements can be made without departing from the concept of the present disclosure, and these all belong to the protection scope of the present disclosure. Therefore, the scope of protection of the patent of the present disclosure should be determined by the appended claims.

What is claimed is:

1. A lighting lamp, wherein the lighting lamp comprising:

a lamp housing, wherein the lamp housing is provided with a lamp body accommodating cavity;

a first light source component, wherein the first light source component is provided on the lamp housing, and a luminous surface of the first light source component is located in the lamp body accommodating cavity;

a second light source component, wherein the second light source component is provided on the first light source component or the lamp housing, and a luminous surface of the second light source component is located in the lamp body accommodating cavity; and an electrical connecting component, wherein the electrical connecting component is provided on the lamp housing, the electrical connecting component is electrically connected to the first light source component and the second light source component, and the electrical connecting component is used to electrically connect to an external power source; further comprising a lampshade body component and a solar panel component; the lampshade body component is provided with an accommodating cavity, and the lamp housing and the electrical connecting component are provided on the lampshade body component; and the solar panel component is provided on the lampshade body component, and the solar panel component is arranged to be unfolded or stored relative to the lampshade body component, and the solar panel component is electrically connected to the first light source component B and the second light source component;

wherein the solar panel component; (i) is rotatably connected to the lampshade body component, and the solar panel component is arranged to be unfolded or stored relative to the lampshade body component when rotating relative to the lampshade body component, (ii) or the solar panel component and the lampshade body component are detachable;

when the solar panel component is provided on the lampshade body component, the solar panel component is unfolded relative to the lampshade body component, and the solar panel component is arranged to be stored in the lampshade body component when disassembled from the lampshade body component;

the solar panel component includes a supporting plate and a solar panel: the supporting plate is rotatably connected to the lampshade body component, and a mounting groove is provided on the supporting plate; and the solar panel is provided on the supporting plate and is clamped at the mounting groove.

2. The lighting lamp according to claim 1, wherein the first light source component includes a first mounting plate and a first lamp bead, the mounting plate is provided on the lamp housing, and the first lamp bead is provided on the first mounting plate.

3. The lighting lamp according to claim 2, wherein the second light source component includes a second mounting plate and a second lamp bead; and the second mounting plate is provided on the first mounting plate, a horizontal direction of the second mounting plate intersects with a length direction of the lamp housing, the second mounting plate extends along the length direction of the lamp housing, a plurality of second lamp beads are arranged, and the plurality of second lamp beads are sequentially arranged along an extension direction of the second mounting plate;

and/or a plurality of first lamp beads are arranged, and the plurality of first lamp beads are distributed on the first mounting plate.

4. The lighting lamp according to claim 1, wherein the electrical connecting component includes a USB plug and a socket component; and the Universal Serial Bus (USB) plug is provided on the lamp housing, the USB plug is electrically connected to the first light source component and the second light source component, the socket component is provided on the lamp housing, and the socket component is adapted to the USB plug.

5. The lighting lamp according to claim 4, wherein the socket component includes a USB socket, a positioning member, a positioning base and a wiring tube; and a portion of the positioning member passes through the USB socket and then is connected to the lamp housing, the positioning base is located between the USB socket and the lamp housing, the wiring tube is connected to the positioning base, and the USB socket is adapted to the USB plug;

and/or an interface of the USB plug is a Type A interface or a Type C interface, and further includes at least one light source component, and at least one of the light source component is connected to the USB plug.

6. The lighting lamp according to claim 1, wherein the lamp housing includes a lampshade housing and a base housing; and the lampshade housing is provided on the base housing, the lampshade housing is provided with the lamp body accommodating cavity, the lampshade housing and the base housing are enclosed to form a mounting cavity, and a portion of the electrical connecting component is located in the mounting cavity.

7. The lighting lamp according to claim 6, wherein the lampshade housing includes a supporting housing and a lampshade; the supporting housing is provided on the base housing, and the supporting housing and the base housing are enclosed to form the mounting cavity; the lampshade is provided on the supporting housing, and the lampshade and the supporting housing are enclosed to form the lamp body accommodating cavity; and the first light source component is provided on the supporting housing; and the portion of the electrical connecting component is provided on the supporting housing, and another portion of the electrical connecting component is provided on the base housing.

8. The lighting lamp according to claim 1, further comprising a power module, a switch module and a motion sensing module; the power module is configured to supply power to the first light source component and the second light source component; the switch module includes a first switch module and a second switch module; the first switch module is connected between the power module and the first light source component, and the second switch module is connected between the power module and the second light source component; and the motion sensing module is connected to the power module, the first switch module and the second switch module respectively, and the motion sensing module is used to control an on/off of the first switch module and the second switch module.

9. The lighting lamp according to claim 8, wherein the power module includes a solar panel component, an energy storage battery and a power processing module; and the solar panel component is connected to the energy storage battery, the energy storage battery is connected to the motion sensing module, the first switch module and the second switch module respectively, and the power processing module is connected to the solar panel component and the energy storage battery respectively.

10. The lighting lamp according to claim 8, wherein the first switch module includes a first switch tube, a gate electrode of the first switch tube is connected to the motion sensing module, a source electrode of the first switch tube is connected to the power module, and a drain electrode of the first switch tube is connected to the first light source component.

11. The lighting lamp according to claim 8, wherein the second switch module includes a second switch tube, a gate electrode of the second switch tube is connected to the motion sensing module, a source electrode of the second switch tube is connected to the power module, and a drain electrode of the second switch tube is connected to the second light source component.

12. The lighting lamp according to claim 8, further comprising a power adjustment module, the power adjustment module is connected to the motion sensing module and the second light source component respectively, and the power adjustment module is configured to adjust a luminous power of the second light source component according to a detected motion.

13. The lighting lamp according to claim 9, further comprising a brightness sensing module, the brightness sensing module is connected to the power module and the first switch module respectively, and the brightness sensing module is configured to control the on/off of the first switch module according to the detected brightness information.

14. The lighting lamp according to claim 1, further comprising a lampshade body component and a solar panel component; the lampshade body component is provided with an accommodating cavity, and the lamp housing and the electrical connecting component are provided on the lampshade body component; and the solar panel component is provided on the lampshade body component, and the solar panel component is arranged to be unfolded or stored relative to the lampshade body component, and the solar panel component is electrically connected to the first light source component and the second light source component.

15. The lighting lamp according to claim 14, wherein the solar panel component is rotatably connected to the lampshade body component, and the solar panel component is arranged to be unfolded or stored relative to the lampshade body component when rotating relative to the lampshade body component;

or the solar panel component and the lampshade body component are detachable; when the solar panel component is provided on the lampshade body component, the solar panel component is unfolded relative to the lampshade body component, and the solar panel component is arranged to be stored in the lampshade body component when disassembled from the lampshade body component.

16. The lighting lamp according to claim 14, wherein the solar panel component includes a supporting plate and a solar panel; the supporting plate is rotatably connected to the lampshade body component, and a mounting groove is provided on the supporting plate; and the solar panel is provided on the supporting plate and is clamped at the mounting groove.

17. The lighting lamp according to claim 16, wherein the supporting plate includes a supporting plate body and a hinge rod, and the mounting groove is provided on the supporting plate body, the solar panel is provided on the supporting plate body, the hinge rod is provided on the supporting plate body, and the hinge rod is rotatably provided on the lampshade body component;

and/or further includes a locking member, wherein the locking member is provided on the supporting plate and is located at a connection between the supporting plate and the lampshade body component.

18. The lighting lamp according to claim 14, wherein the lampshade body component includes a supporting component, a cover body component and an outer lampshade, the cover body component is provided on the supporting component, the outer lampshade is provided on the cover body component, the outer lampshade is provided with the accommodating cavity, the lamp housing is provided on the cover body component or the outer lampshade, and the solar panel component is provided on the cover body component or the outer lampshade.

19. The lighting lamp according to claim 18, wherein the cover body component includes an upper cover, a control box and a hanging hook, the control box is provided on the upper cover, the outer lampshade is provided on the control box, the hanging hook is provided on the upper cover and is connected to the supporting component, the outer lampshade is provided on the control box, and the solar panel component is rotatably provided on the upper cover.

20. The lighting lamp according to claim 19, wherein the supporting component includes a back plate, a supporting rod and a connecting tube, and the supporting rod is provided on the back plate, the supporting rod is adapted to the hanging hook, one end of the connecting tube is connected to the control box, and another end of the connecting tube is connected to the back plate;

and/or the outer lampshade includes an outer lampshade bracket and a panel, the outer lampshade bracket is provided on the control box, the outer lampshade bracket is provided with a plurality of light transmitting openings, a plurality of panels are arranged, and the plurality of panels are provided on the outer lampshade bracket and are respectively covered at the plurality of light transmitting openings;

and/or a limiting groove is provided on the upper cover, opposite sides of a groove wall of the limiting groove are provided with limiting holes, the limiting holes are adapted to the solar panel component, and the solar panel component is rotatably connected to the upper cover at the limiting hole.

* * * * *